(12) United States Patent  
Wurtz, Jr. et al.

(10) Patent No.: US 11,499,459 B2  
(45) Date of Patent: Nov. 15, 2022

(54) NEAR-ZERO EMITTING DIESEL-ELECTRIC LOCOMOTIVE USING A HIGH-SPEED DIESEL ENGINE

(71) Applicants: Catalytic Combustion Corporation, Bloomer, WI (US); Knoxville Locomotive Works, Inc., Knoxville, TN (US)

(72) Inventors: James M. Wurtz, Jr., Mokena, IL (US); Scott Gatewood, Knoxville, TN (US); Michael Thomason, Knoxville, TN (US); D. Todd Jacobs, Lago Vista, TX (US); Daniel R. Piche, Eau Claire, WI (US); Cody J. Molls, Chippewa Falls, WI (US); H. Peter Claussen, Knoxville, TN (US); John W. Robinson, Jr., Bloomer, WI (US)

(73) Assignees: Catalytic Combustion Corporation, Bloomer, WI (US); Knoxville Locomotive Works, Inc., Knoxville, TN (US)

( * ) Notice: Subject to any disclaimer, the term of this patent is extended or adjusted under 35 U.S.C. 154(b) by 113 days.

(21) Appl. No.: 17/052,720

(22) PCT Filed: Mar. 8, 2019

(86) PCT No.: PCT/US2019/021266  
§ 371 (c)(1),  
(2) Date: Nov. 3, 2020

(87) PCT Pub. No.: WO2019/212641  
PCT Pub. Date: Nov. 7, 2019

(65) Prior Publication Data  
US 2021/0231042 A1 Jul. 29, 2021

Related U.S. Application Data

(60) Provisional application No. 62/667,095, filed on May 4, 2018.

(51) Int. Cl.  
*F01N 3/00* (2006.01)  
*F01N 3/20* (2006.01)  
(Continued)

(52) U.S. Cl.  
CPC .......... *F01N 3/2066* (2013.01); *F01N 3/035* (2013.01); *F01N 3/2892* (2013.01);  
(Continued)

(58) Field of Classification Search  
CPC ...... F01N 3/2066; F01N 3/035; F01N 3/2892; F01N 2560/021; F01N 2560/026  
(Continued)

(56) References Cited

U.S. PATENT DOCUMENTS 8,820,247 B1  9/2014  Claussen et al.  
8,844,273 B2 * 9/2014  Noma .................... F01N 3/023  
                                                                60/285

(Continued)

FOREIGN PATENT DOCUMENTS

WO  2014025538 A1  2/2014

*Primary Examiner* — Jason D Shanske  
(74) *Attorney, Agent, or Firm* — GableGotwals

(57) ABSTRACT

A diesel-electric locomotive includes a diesel emissions reduction unit, including an inlet configured to receive an exhaust stream of a high-speed diesel engine; means for trapping at least a portion of diesel particulate matter contained in the exhaust stream; an aqueous $NH_3$ dosing system including a dosing controller in communication with an electronic locomotive controller and a nitrogen oxide ("$NO_x$") concentration sensor and an ammonia ("$NH_3$") concentration sensor, at least one oxidation catalyst panel arranged to isolate the $NO_x$ concentration sensor from $NH_3$ in the exhaust stream; mixing elements located between the dosing system and the $NO_x$ and $NH_3$ concentration sensors to mix metered aqueous $NH_3$ in the exhaust stream; a selective catalyst reactor bed located between the mixing (Continued)

elements and the $NO_x$ and $NH_3$ concentration sensors; and an exhaust heating system in communication with at least one of the dosing and electronic locomotive controllers.

20 Claims, 12 Drawing Sheets

(51) Int. Cl.
*F01N 3/035* (2006.01)
*F01N 3/28* (2006.01)

(52) U.S. Cl.
CPC .. *F01N 2560/021* (2013.01); *F01N 2560/026* (2013.01); *F01N 2570/14* (2013.01); *F01N 2610/02* (2013.01)

(58) Field of Classification Search
USPC .......................................................... 60/286
See application file for complete search history.

(56) References Cited

U.S. PATENT DOCUMENTS

| | | | |
|---|---|---|---|
| 2011/0072798 A1* | 3/2011 | Herman | F01N 3/208 123/568.21 |
| 2012/0079811 A1 | 4/2012 | Patel et al. | |
| 2012/0258015 A1* | 10/2012 | Ren | B01D 53/9477 422/171 |
| 2015/0165377 A1* | 6/2015 | Schroeder | F01N 3/106 422/119 |
| 2017/0058750 A1 | 3/2017 | Plummer et al. | |

* cited by examiner

NEAR-ZERO EMITTING DIESEL-ELECTRIC LOCOMOTIVE USING A HIGH-SPEED DIESEL ENGINE

CROSS-REFERENCE TO RELATED APPLICATIONS

This United States application is the National Phase of PCT Application No. PCT/US2019/021266 filed 8 Mar. 2019, which claims priority to U.S. Provisional Patent Application No. 62/667,095 filed 4 May 2018, each of which is incorporated herein by reference.

BACKGROUND

This disclosure is in the field of systems, apparatuses, and methods designed to control and treat exhaust streams of diesel engines used in diesel-electric locomotives.

Diesel-electric locomotives typically have a large, single engine prime mover, usually a 12- or 16-cylinder diesel motor that typically drives, on one end, a DC and/or AC main generator and/or an auxiliary generator, and also at least one air compressor. The main generator produces electricity that is transmitted to electric traction motors that sit on top of each axle and provide power to the wheels. There is no mechanical connection between the diesel engine and the wheels. The auxiliary generator provides the power for appliances on the locomotive, such as headlights, fans, and the like. The compressor provides air pressure for operating the locomotive and car airbrakes.

About 97% of the locomotives in service today in North America are made by two manufacturers: Caterpillar ("CAT"), formerly Electro-Motive Diesel, Inc., and General Electric ("GE"). CAT makes two-stroke and four-stroke diesel locomotive engines, while GE makes four-stroke diesel locomotive engines. The majority of Diesel-electric locomotives manufactured currently may start at about 4000-4800 brake horsepower, but the locomotives in service today still include a great many that are of lesser brake horsepower (e.g. 3200 bhp or less).

Federal environmental regulations such as 40 C.F.R. § 1033.101 establish permissible locomotive diesel engine tailpipe emission limits for diesel particulate matter ("DPM"), nitrogen oxides ("$NO_x$"), carbon monoxide ("CO"), and non-methane hydrocarbons ("NMHC"). In addition, end users and operators of the locomotives have demanded more efficient locomotives that consume less fuel while retaining the operability and maintainability of the existing fleet as well as the service knowledge of the current technician staff.

Emission standards for non-road diesel engine emissions have been increasingly tightened through the years, and currently diesel engines designed for use in new locomotive service must meet the U.S. federal emission standards referred to as EPA Tier 4. In addition, the State of California via the California Air Resources Board recently proposed even more strict Tier 5 or "Near Zero" emissions standards concentrating on $NO_x$, particulate matter ("PM"), reactive organic gas ("ROG") and greenhouse gas ("GHG") emitted from locomotive and marine diesel engines. Diesel particulate matter is comprised of about 80% unburned diesel fuel, referred to as the soluble oil fraction, and elemental carbon particles. To date, PM and DPM control has primarily focused on engineering improvements to the engines. However, the cost and availability of the improvements has not met industry needs, leading to other solutions like exhaust after-treatment.

Diesel exhaust after-treatment solutions include oxidation catalysts and diesel particulate filters or wire meshes. The solutions also include selective catalytic reduction ("SCR"), an active emissions control technology. SCR systems include three main components: a controlled injection system for a liquid-reductant reagent, a mixing duct to mix the reagent with the engine exhaust, and a catalyst reactor where the reduction reaction occurs. The reagent converts to ammonia ("$NH_3$") that reduces nitrogen oxides ("NOx") into nitrogen, water, and carbon dioxide, which are then exhausted from the exhaust duct or pipe. If excess $NH_3$ is injected, then $NH_3$ slip occurs. Typically, the liquid-reductant agent is an automotive-grade urea known as diesel exhaust fluid ("DEF"). For emission standards requiring no more than 5 ppm or 10 ppm NOx, or in applications requiring high reduction efficiency, an SCR system is the most cost-effective way to achieve the standards.

To date, high speed diesel-electric locomotive diesel engines, those operating at or above 1150 rpm, have had difficulty achieving federal emission standards of Tier 4 and have been unable to achieve the 2025 proposed implementation of Tier 5 or near zero emission standards.

SUMMARY

Embodiments of a near zero emission diesel-electric locomotive of this disclosure using a high-speed diesel engine include an electronic locomotive control system and a diesel emission reduction system. The electronic locomotive control system regulates and optimizes available engine power in each throttle position or notch to maintain fuel efficiency, reduce engine-generated emissions, and reduce wheel spin as well as providing for automatic engine start-stop capabilities. The diesel emission reduction system may contain a closed-loop dosing control system including nitrogen oxides ("$NO_x$") and ammonia ($NH_3$) concentration sensors and an exhaust heating system configured to bring engine exhaust within a reaction temperature range. The NOx sensor may be isolated from the $NH_3$ exposure to provide an accurate $NO_x$ reading, and therefore accurate dosing control, at all throttle notches. At idle and at lower throttle notches, the control system may activate the heating system to heat the engine exhaust to provide the exhaust temperatures at which the catalyst systems can effectively operate.

The system may also include one or more diesel oxidation trap catalysts ("DOTC") or diesel particulate filter ("DPF") elements configured for diesel particulate matter ("DPM") control. The system may also include mixing elements to create a homogeneous mixture of ammonia ("$NH_3$") in the exhaust stream prior to a selective catalytic reduction ("SCR") catalyst. The system may be configured to reduce DPM, $NO_x$, carbon monoxide ("CO"), and non-methane hydrocarbons ("NMHC"). U.S. EPA Tier 4 emission performance or its equivalent may be achieved.

Embodiments of this disclosure may be used in locomotive applications including but not limited to switch service, road-switch service, industrial service, passenger service and line haul service. Prior to this disclosure, the combination of components disclosed herein has never been applied to a locomotive and represents an effective way to reduce engine tailpipe emissions below U.S. EPA limits, reduce fuel consumption, reduce engine lube oil consumption, maintain operator knowledge base, maintain technician knowledge base, reduce end user training requirement, and maintain and enhance operator safety. Embodiments of this disclosure enable significant reduction in fuel consumption compared to locomotives utilizing medium-speed engines and enables ultra-low to near zero tailpipe emissions from the diesel engine resulting in compliance with the strictest emission standard for locomotives in the world, U.S. EPA Tier 4 standards.

In embodiments of a diesel-electric locomotive of this disclosure, the locomotive may include an electronic locomotive controller in electronic communication with a diesel engine having a designed operating range at or above 1150 rpm to 1800 rpm and up to 2400 rpm; a traction generator connected at one end to the diesel engine, the traction generator being at a same or a lower speed than that of the diesel engine; a diesel emissions reduction unit, which may be an SCR reactor, the unit including an inlet configured to receive an exhaust stream of the diesel engine; means for trapping at least a portion of diesel particulate matter contained in the exhaust stream; a dosing system including a dosing controller including associated hardware and software in electronic communication with the electronic locomotive controller and a $NO_x$ concentration sensor and an $NH_3$ concentration sensor, the dosing system configured to meter aqueous $NH_3$ into the exhaust stream and including at least one oxidation catalyst panel arranged to isolate the $NO_x$ concentration sensor from $NH_3$ in the exhaust stream; mixing elements located between the dosing system and the $NO_x$ and $NH_3$ concentration sensors to mix the metered aqueous $NH_3$ in the exhaust stream; and engine exhaust heating system in electronic communication with at least one of the dosing and electronic locomotive controllers. A selective catalyst reactor bed may be located between the mixing elements and the $NO_x$ and $NH_3$ concentration sensors. The heating system may include at least one heater located to heat the exhaust stream of the diesel engine toward the inlet of the diesel emissions reduction unit. Embodiments may further comprise the at least one heater including an electric heating element. The at least one heater may be connected to the traction generator.

In some embodiments, the means for trapping the diesel particulate matter include diesel oxidation trap catalyst comprised of a substrate including one or more coated, corrugated, micro-expanded metal foil layers; each of said layers containing a plurality of eyes with openings; a coating of each said layer including a precious metal, a metal oxide, and a porous surface. Embodiments may further comprise the $NH_3$ concentration sensor located within an interior space of an exhaust stack of the diesel emissions reduction unit, toward an inlet end of the exhaust stack; and a box located within the exhaust stack, downstream and adjacent to the $NH_3$ concentration sensor; the box including the at least one oxidation catalyst panel and the $NO_x$ concentration sensor. The $NH_3$ concentration sensor and the $NO_x$ concentration sensor may include a controller area network bus connector. The $NH_3$ concentration sensor and the $NO_x$ concentration sensor may be mounted transverse to a longitudinal axis of the exhaust stack.

The mixing elements may comprise a mixing duct including a rectangular cross-section containing a plurality of static mixer assemblies. At least one static mixer may be configured to divert the exhaust and liquid reagent stream in a different direction than at least one other of the static mixers.

Embodiments of a method of treating an exhaust stream of a diesel-electric locomotive include passing the exhaust stream into the diesel emissions reduction unit and, prior to the passing, heating the exhaust stream when a temperature of the exhaust stream falls below a predetermined temperature.

BRIEF DESCRIPTION OF THE DRAWINGS

FIG. 2 is a schematic of an embodiment of a high-speed diesel engine including an electronic locomotive control system and a diesel engine emission reduction system of this disclosure.

DETAILED DESCRIPTION

For the purposes of this disclosure, a specified range also discloses narrower subranges within the range, as well as individual discrete values within the range. A high-speed locomotive diesel engine is a locomotive diesel engine operating above approximately 1150 rpm to 1800 and up to 2400 rpm, there being subranges within this broader range. Horsepower rating may be in a range of about 1000 bhp (brake horsepower) to approximately 3220 bhp. A medium-speed locomotive diesel engine is a locomotive diesel engine operating in a range from 800-1150 rpm, Horsepower rating may be up to about 4800 bhp. Light engine load means when the locomotive diesel engine is idling or when the throttle control is in the first (slowest speed) position or notch, the engine exhaust temperature being below about 410° F. (210° C.).

Figure 1:
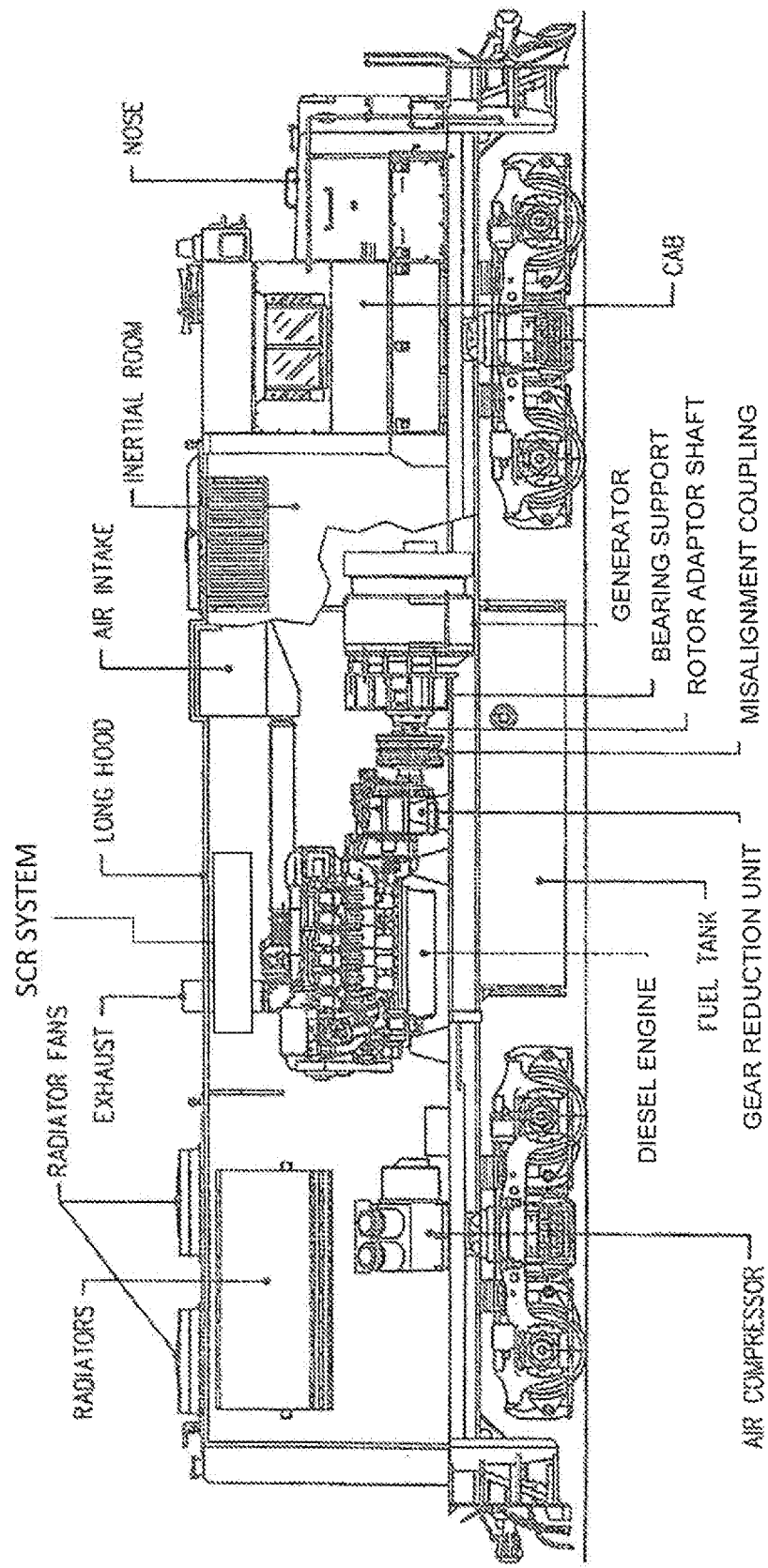
FIG. 1 shows an example of a diesel-electric locomotive that may be equipped or retrofitted with a selective catalytic reduction ("SCR") system of this disclosure. A high-speed diesel engine is connected through a gear reduction unit to a lower speed generator/alternator. In other embodiments, a high-speed engine may be connected to a same speed generator/alternator (see e.g.
Figure 2:
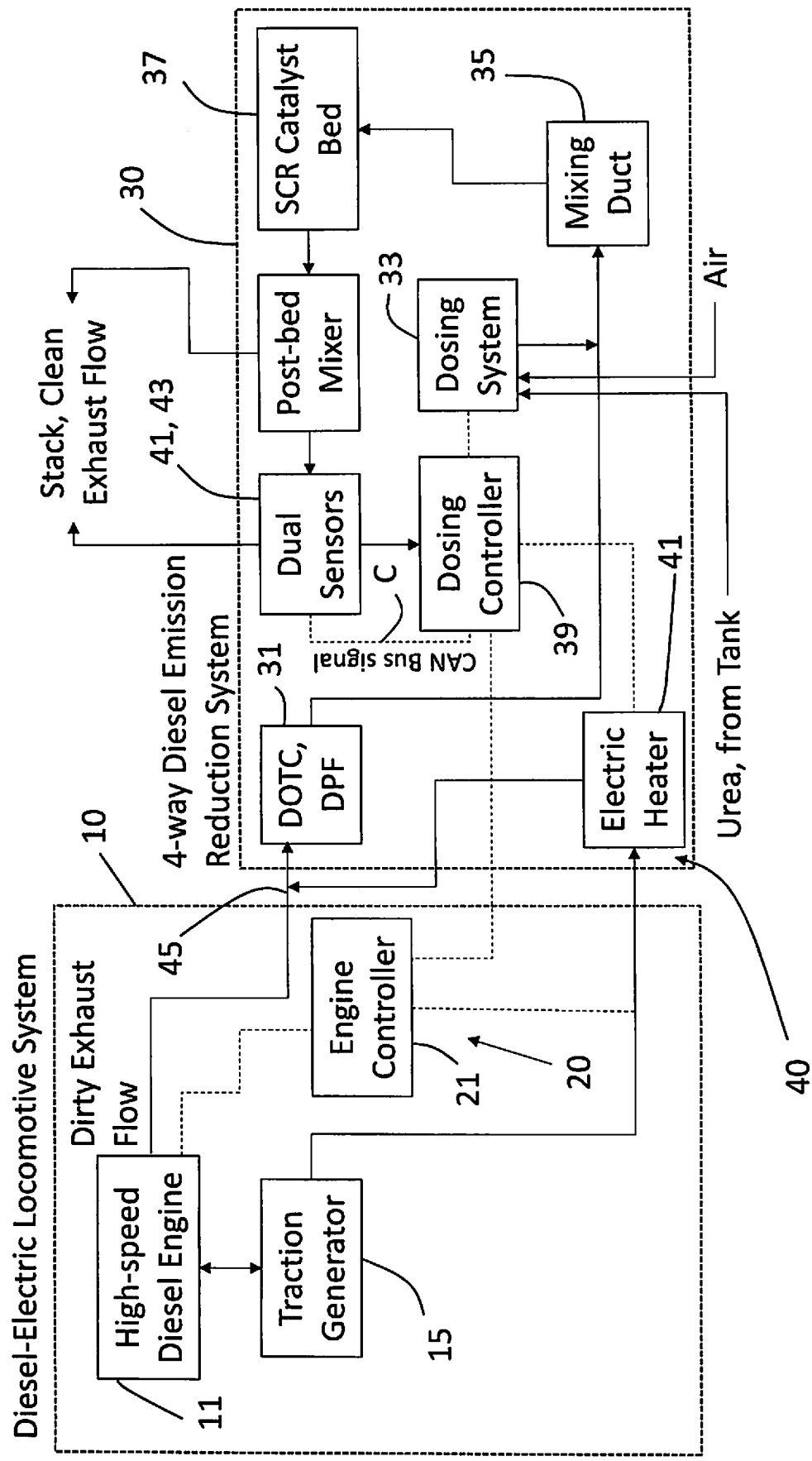
FIG. 2). The SCR system of this disclosure may be mounted where appropriate.
Figure 3:
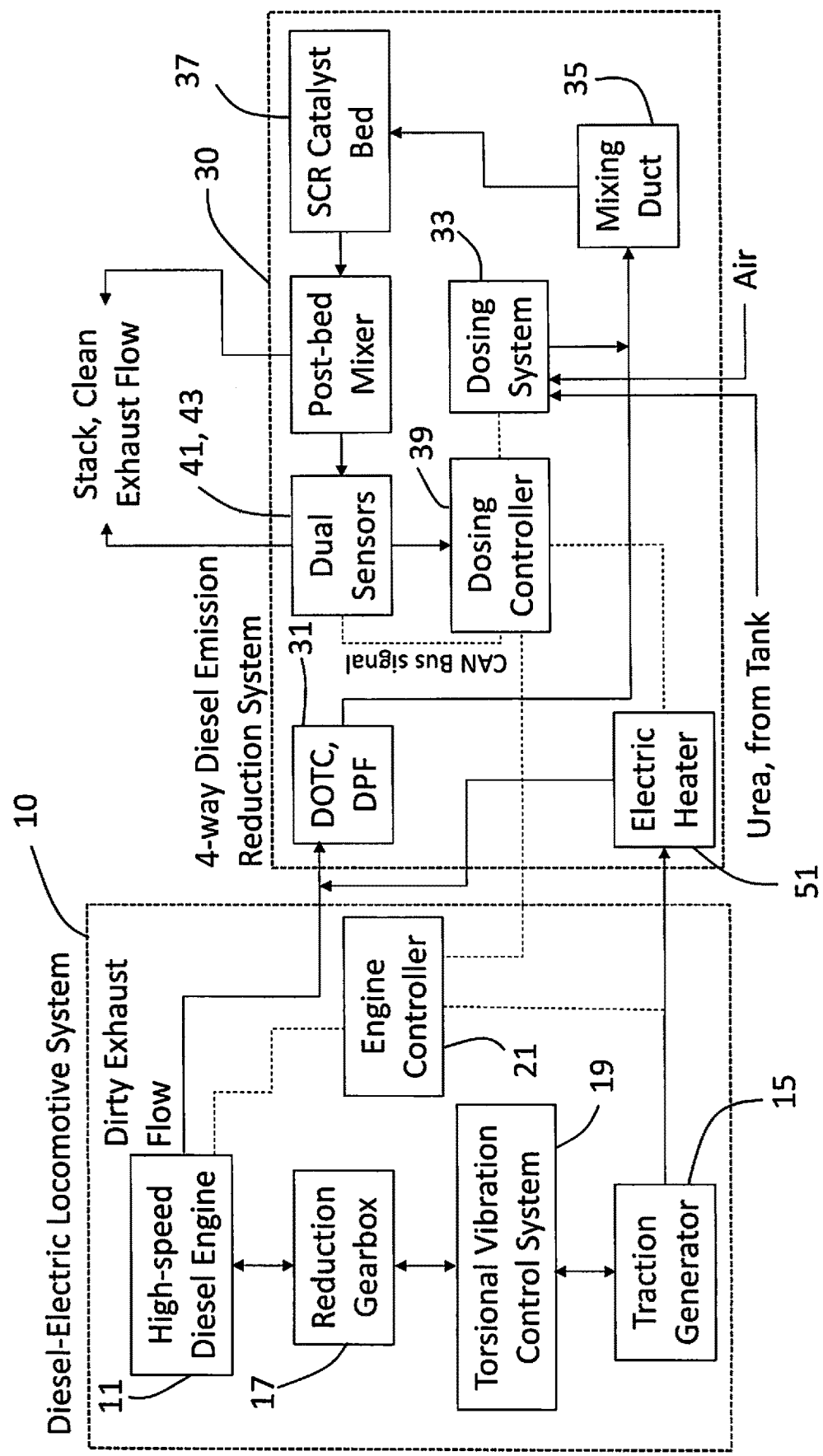
FIG. 3 is a schematic of another embodiment of a high-speed diesel engine including an electronic locomotive control system and a diesel engine emission reduction system of this disclosure. The diesel engine is connected to a lower speed generator/alternator.
Figure 4:
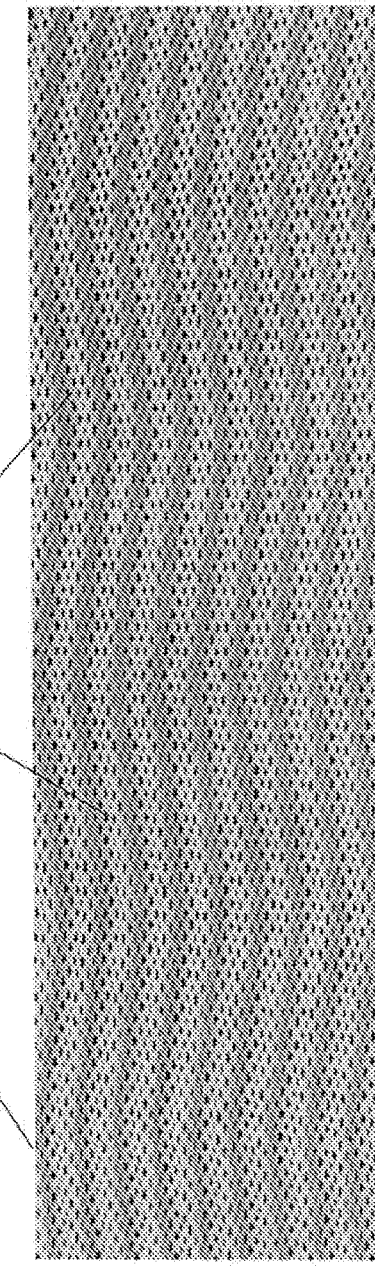
FIG. 4 is a photograph showing a top plan view of an embodiment of a micro-expanded metal foil layer of a diesel oxidation trap catalyst ("DOTC") of this disclosure after passing through a corrugation process. The darker bands are shadows caused by a herringbone-type pattern of the corrugated micro-expanded metal foil shading the light.
Figure 6:
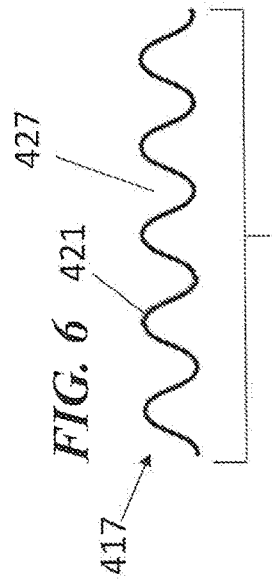
FIG. 6 is a schematic showing a side elevation view of the micro-expanded foil of FIG. 5 after corrugation.
Figure 7:
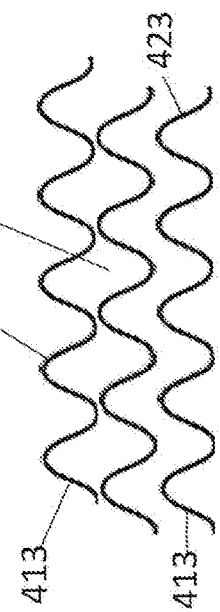
FIG. 7 is a schematic showing a side elevation view of a layered stack of the micro-expanded foil of FIG. 5.
Figure 5:
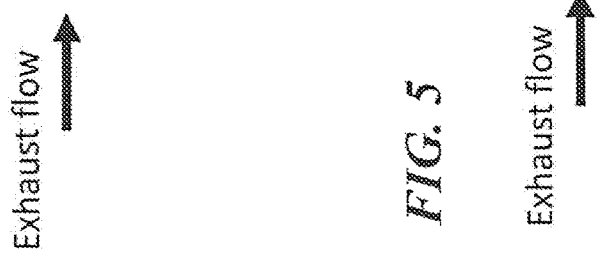
FIG. 5 is a schematic showing a top plan view of a layer of an embodiment of a micro-expanded metal foil of this disclosure prior to corrugation to emboss a herringbone-style pattern on the foil.

Referring to FIGS. 1-3, in embodiments of this disclosure a diesel emission reduction system 30 treats an exhaust flow of a diesel-electric locomotive system 10. The diesel-electric locomotive system 10 may include a high-speed diesel engine 11 and an electronic locomotive control system 20 including an engine controller 21. The electronic locomotive control system 20 regulates and optimizes available engine power in each throttle position or notch to maintain fuel efficiency, reduce engine-generated emissions, and reduce wheel spin as well as providing for automatic engine start-stop capabilities. Embodiments of the diesel emission reduction system 20 may include an integrated exhaust stream heating system 50 that may be located toward an inlet 45 of the diesel emissions reduction system 30. The system may be configured to reduce emissions of diesel particulate matter ("DPM"), nitrogen oxides ("$NO_x$"), carbon monoxide ("CO") and non-methane hydrocarbons ("NMHC"). The locomotive may be a locomotive retrofitted as described in U.S. Pat. No. 8,820,247 B1 to Claussen et al. ("Claussen"), the content of which is incorporated by reference herein.

In embodiments, the high-speed diesel engine 11 may be operated to rotate a generator 15 or alternator which provides direct current electrical power that is utilized by traction motors to move the locomotive forward and reverse and 3-phase alternating current which powers auxiliary equipment such as cooling fans and blower motors. The electronic locomotive control system 20 precisely controls the diesel engine 11 in the most efficient way possible and allocates electrical power to the traction motors to move the locomotive and controls all auxiliary electrical loads. An auxiliary drive assembly ("ADA") may contain an air compressor, an auxiliary generator and/or electric motor(s) mechanically driven at optimal speed directly by the diesel engine 11.

The high-speed diesel engine 11 may be combined with a high-speed alternator (which is traditionally done in the art) or it may be combined with a lower speed alternator through a gear reduction gearbox 17 so that a lower speed traction generator 15 may be used. A control system 19 like that disclosed by Claussen may be used to dampen torsional vibration generated by the high-speed engine 11 from being transmitted to the rigidly mounted generator 15 as well as mitigating misalignment caused by engine movement.

The diesel emission reduction system 30 may include one or more of the following features:

means 31 to reduce DPM such as a diesel particulate filter ("DPF") of a kind known in the art or a diesel oxidation trap catalyst ("DOTC") of this disclosure, a dosing system 33 to precisely meter a liquid-reductant agent such as diesel exhaust fluid ("DEF") into an injection duct of a selective catalytic reactor ("SCR") system;

mixing elements 35 configured to create a homogeneous mixture of ammonia ("$NH_3$") in the exhaust stream prior to an SCR catalyst 37);

a closed-loop dosing control system including a controller 39 and $NO_x$ and $NH_3$ concentration sensors 41, 43 (which may include a controller area network ("CAN") bus connector C) arranged to prevent cross-interference of the NOx sensor 41 by excess $NH_3$ in the exhaust stream; and an engine exhaust heating system to automatically provide the exhaust temperatures necessary for the diesel emission reduction system 30 to reduce emissions at light engine loads where native engine exhaust temperatures are not sufficient for system operations. In some embodiments, the heater 51 is powered by a traction generator 15.

Engine exhaust is routed through the diesel emission control system 30 where the diesel emissions are converted to nitrogen, water vapor and $CO_2$. In embodiments, the electronic locomotive control system 20 and the liquid-reductant agent dosing system 33 communicate so that the emission control system will precisely inject the agent, such as DEF, appropriately based upon engine operation. Low sulphated ash engine oils of a kind known in the art may also be used.

Figure 14:
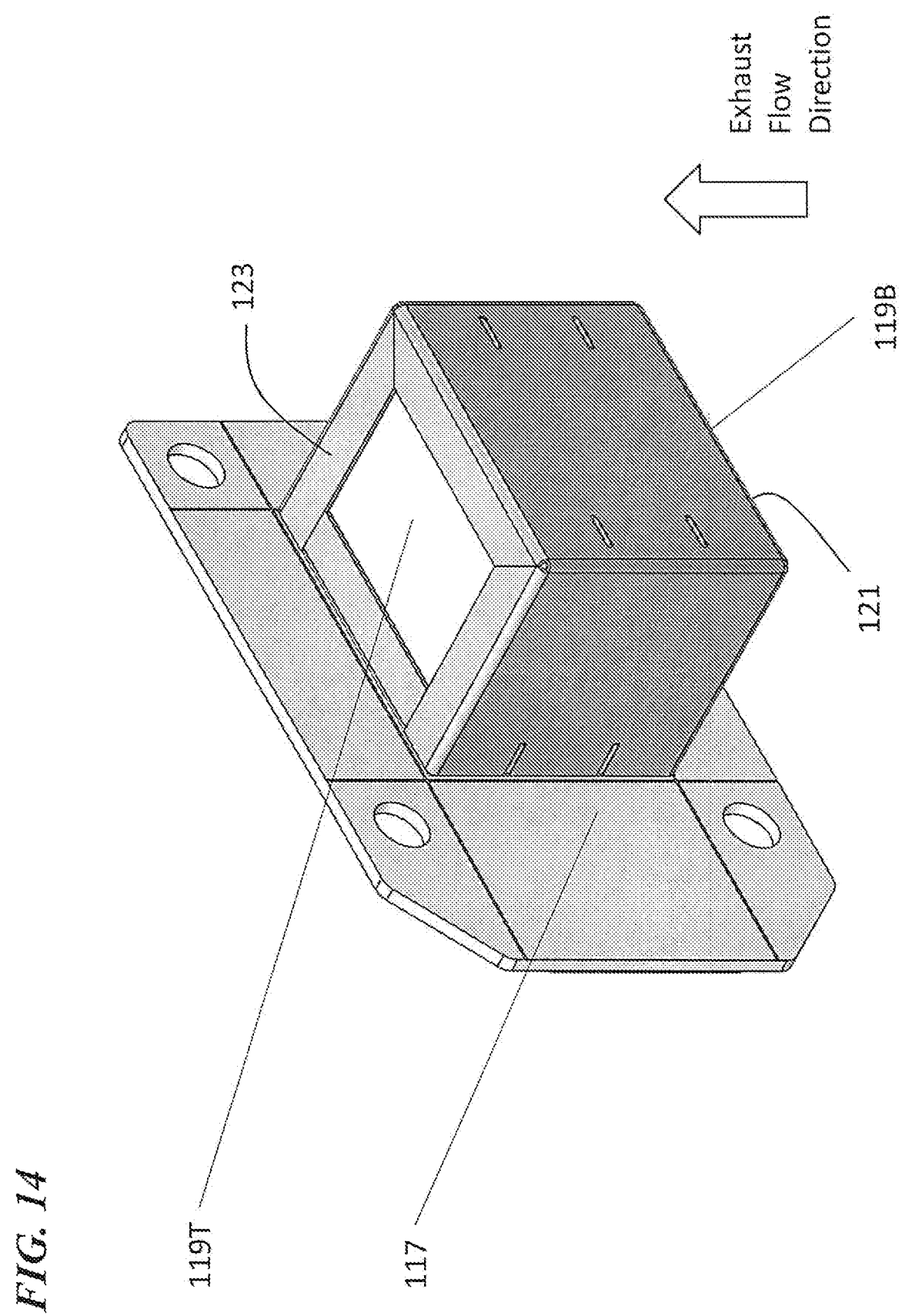
FIG. 14 is an isometric view of the linear box of FIG. 12. Oxidation catalyst panels are located at the top and bottom, thereby isolating the $NO_x$ sensor from $NH_3$ slip.
Figure 15:
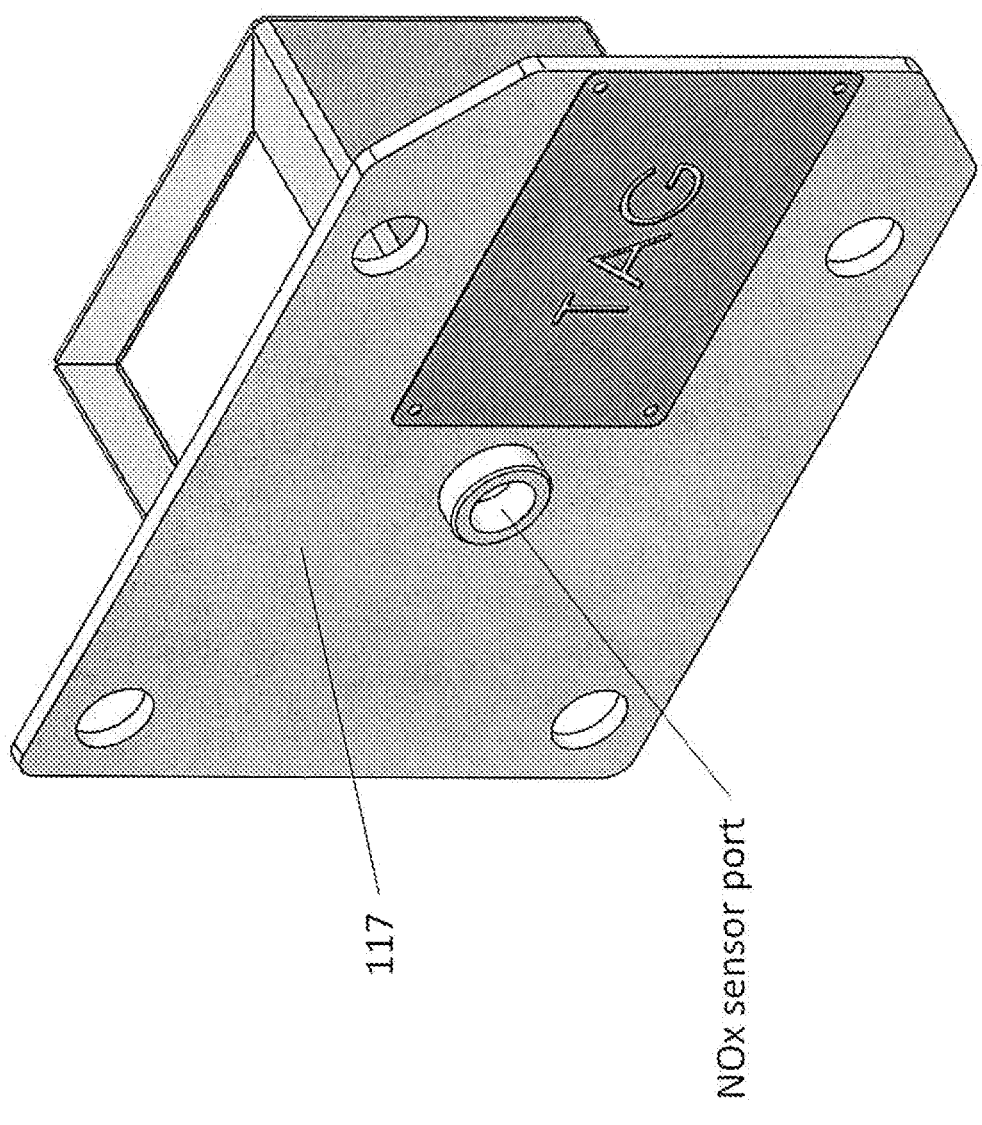
FIG. 15 is an isometric view of the linear box of FIG. 14. The box includes a $NO_x$ sensor port arranged so the sensor lies in between the top and bottom oxidation catalyst panels.

The closed loop dosing control system 39 controls the amount of liquid-reductant agent or DEF that is metered into the exhaust stream via a targeted $NO_x$ value, utilizing a $NO_x$ concentration sensor 41 to sense the amount of $NO_x$ in the exhaust stream. Oxidation catalyst panels, see e.g. FIG. 14, protect or isolate the NOx concentration sensor 41 to prevent $NH_3$ cross interference. An $NH_3$ sensor 43 is used to detect excess $NH_3$ in the exhaust stream. The sensors 41, 43 are coupled to control logic which ensures extremely precise metering of the DEF into the exhaust stream.

In embodiments, one or more heaters 51 are integrated into the emission control system reactor and generate heat necessary for the emission reduction reactions to occur in the emission control system 30 when the engine is operating at light loads and not generating a high enough exhaust temperature to support system operation. At these loads heating system 50 may be employed to raise the native engine exhaust temperature to one that facilitates or enables the reaction temperature. In embodiments, the heating system 50 raises the temperature of the exhaust above the native engine exhaust temperature at a given load to a second higher temperature at that same load, the second higher temperature being in a reaction temperature range. By way of a non-limiting example, native engine exhaust temperatures at light loads can be below 410° F. (210° C.). At idle the native engine exhaust temperature may typically be about 350° F. (176.7° C.). In a first notch position, it may take the engine upwards of about 20 minutes or so for temperatures to reach 410° F. (210° C.). The heating system may raise the exhaust temperature to predetermined reaction temperature in a range of 400° F. to 460° F. (204.4° C. to 237.8° C.), 410° F. to 450° F. (210° C. to 232.2° C.), 415° F. to 445° (212.8° C. to 229.4° C.), 420° F. to 440° (215.6° C. to 226.7° C.), 425° F. to 435° (218.3° C. to 223.9° C.), 427° F. to 432° (229.4° C. to 222.2° C.), and 430° (221.1° C.), there being subranges within these ranges. In embodiments in which an electric heater 51 is used, the heater 51 may be powered by the traction generator 15 and jointly controlled by the electronic locomotive control system 20 and the dosing system controller 39. By way of a non-limiting example, process temperature may be provided by the dosing system controller 39 and over-temperature protection of the heater 51 may be controlled by the electronic locomotive control system 20. Process control of the heater 51 may be through the electronic locomotive control system 20 based upon engine load, process temperature, and throttle demand.

Referring now to FIGS. 4-7 and 9, a DOTC 410 for use in a diesel emission reduction system of this disclosure may be used to fill a niche between standard oxidation catalyst and DPFs for the control of DPM. A DOTC made by Catalytic Combustion Corporation (Bloomer, Wisconsin) and disclosed in PCT/US2019/013433, incorporated by reference herein, is a suitable DOTC for use in embodiments of this disclosure. In embodiments, the DOTC may include a structure (substrate) 411 comprising one or more coated, corrugated micro-expanded metal foil layers 413 and a frame 415 housing or encapsulating the substrate 411. The metal foil may be a stainless-steel alloy including aluminum or iron-chromium-aluminum (FeCrAl) alloy. The alloy may include chromium in a range of about 18 wt % to about 24 wt %, there being subranges within this range. The alloy may include aluminum in a range of about 3 wt % to about 7 wt %, there being subranges within this broader range. The coated surface 421 of the DOTC may be a high surface area, stabilized, and promoted washcoat layer 423.

The corrugated pattern 425 may include a herringbone-style pattern that, when in use, is oriented in a longitudinal direction L of the diesel engine exhaust flow (transverse T to the eye 419), with flow impinging on the metal foil strand walls 423 surrounding the eyes 419. The micro-expanded metal foil provides small openings or eyes that, as the exhaust flow passes through the catalyst (transverse to the eye opening), DPM in the flow impinges on the surface and becomes trapped in the eyes. The density of cells of the corrugated pattern 425—defined as the number of flow channels 427 per unit area of a catalyst face 429—may be in a range of about 100 cells/in$^2$ (15 cells/cm$^2$) to about 400 cells/in$^2$ (62 cells/cm$^2$), there being subranges within this broader range.

In some embodiments, the DOTC includes a substrate 411 containing one or more coated, corrugated, micro-expanded metal foil layers, each of the layers 413 containing a plurality of eyes 419 containing openings in a range of 0.020 inches to 0.080 inches (0.058 mm to 2.032 mm). A coating 421 of each layer 413 may include a precious metal, a metal oxide, and a porous surface area—as measured by the Brunauer, Emmett, and Teller ("BET") method—in a range of 100 m$^2$/g to 250 m$^2$/g (488,246 ft$^2$/lb to 1,220,616 ft$^2$/lb) of the metal oxide, there being sub-ranges ranges within this broader range. The mass loading of the washcoat layer 421 may be about 1½ g/in$^3$ (91.54 g/l) or in a range of 80.5 g/l to 102.5 g/l. A precious metal loading may be on top of or in addition to this washcoat loading. The precious metal may be a platinum group metal—ruthenium, rhodium, palladium, osmium, iridium, and platinum—or a platinum group metal alloy or bi-metallic catalyst. The precious metal may also comprise or include gold or silver.

Figure 8:
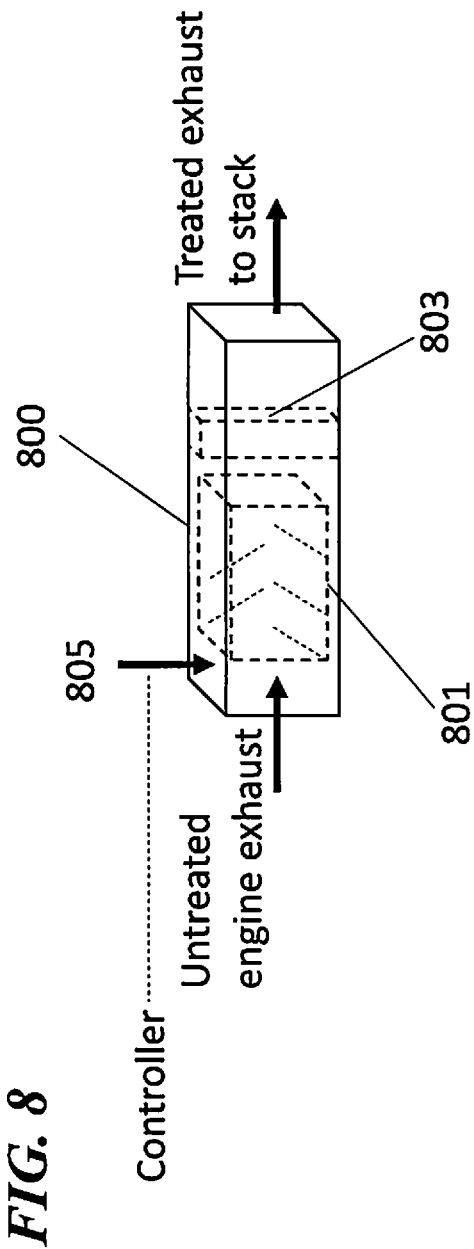
FIG. 8 is a schematic of an embodiment of a mixing duct and static mixer assembly of this disclosure housed within a reactor of an SCR system.
Figure 9:
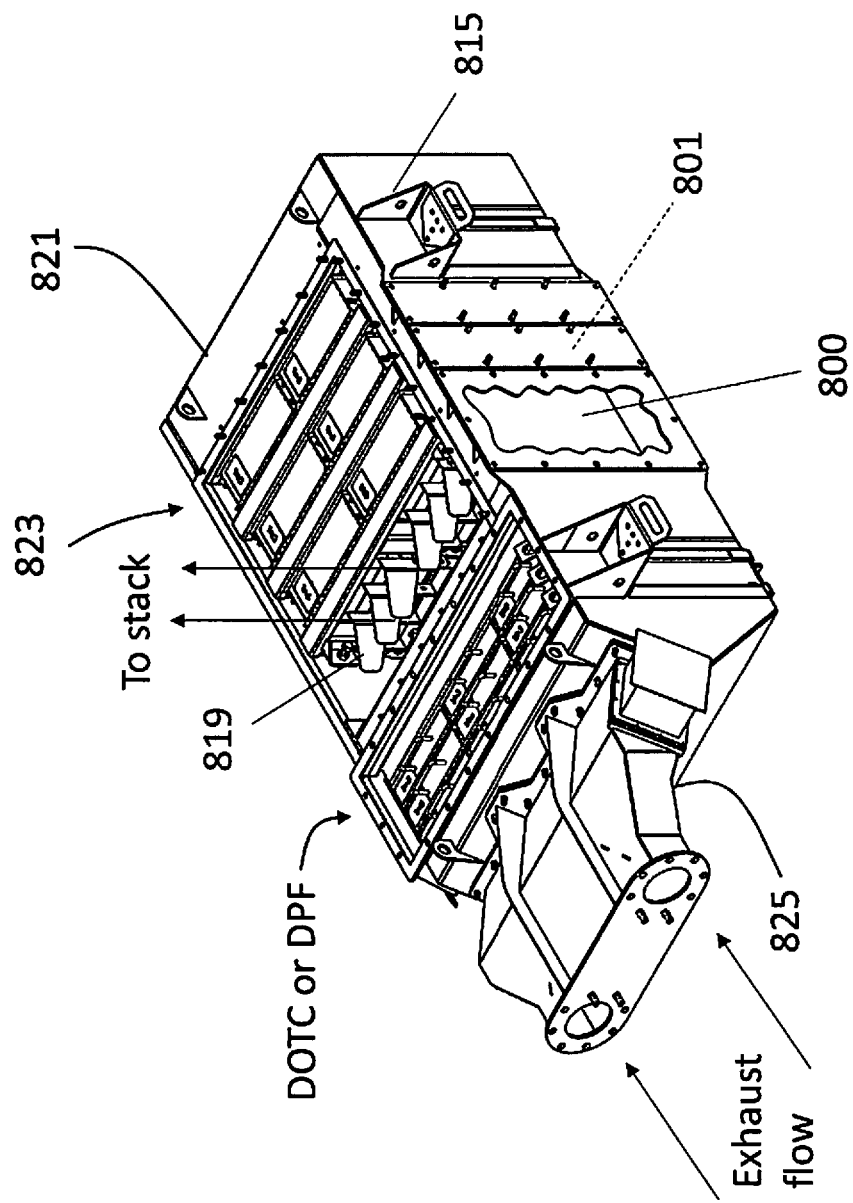
FIG. 9 is an isometric view of an SCR reactor with a portion of its long side wall removed to expose a mixing duct that contains a plurality of static mixers.
Figure 10:
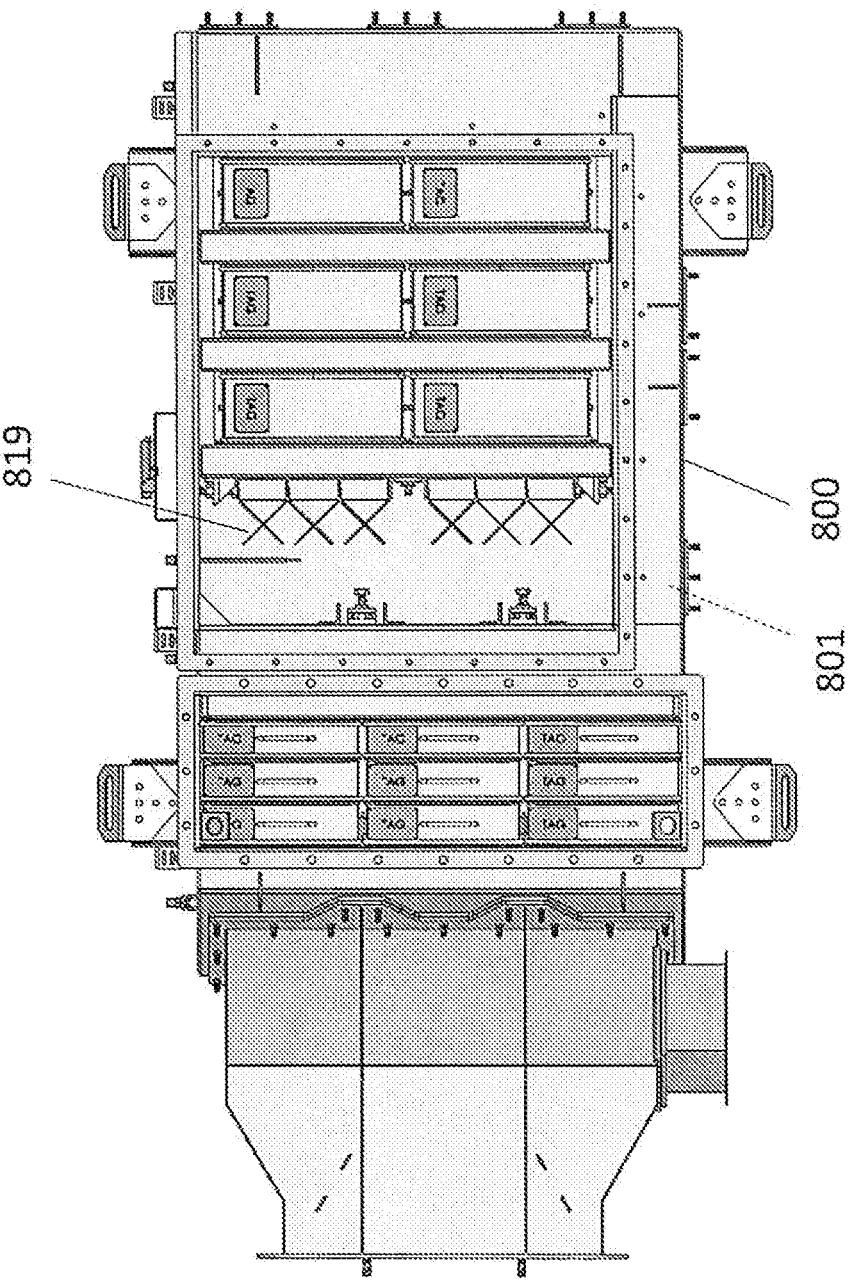
FIG. 10 illustrates an embodiment of a mixing blade set located downstream of an SCR catalyst bed and arranged to remix all molecules just upstream of a nitrogen oxides ("$NO_x$") sensor and ammonia ("$NH_3$") slip sensor. This post-SCR catalyst bed mixing can help lower variation in sensor readings and improve accuracy and precision of both sensors' readings.
Figure 11:
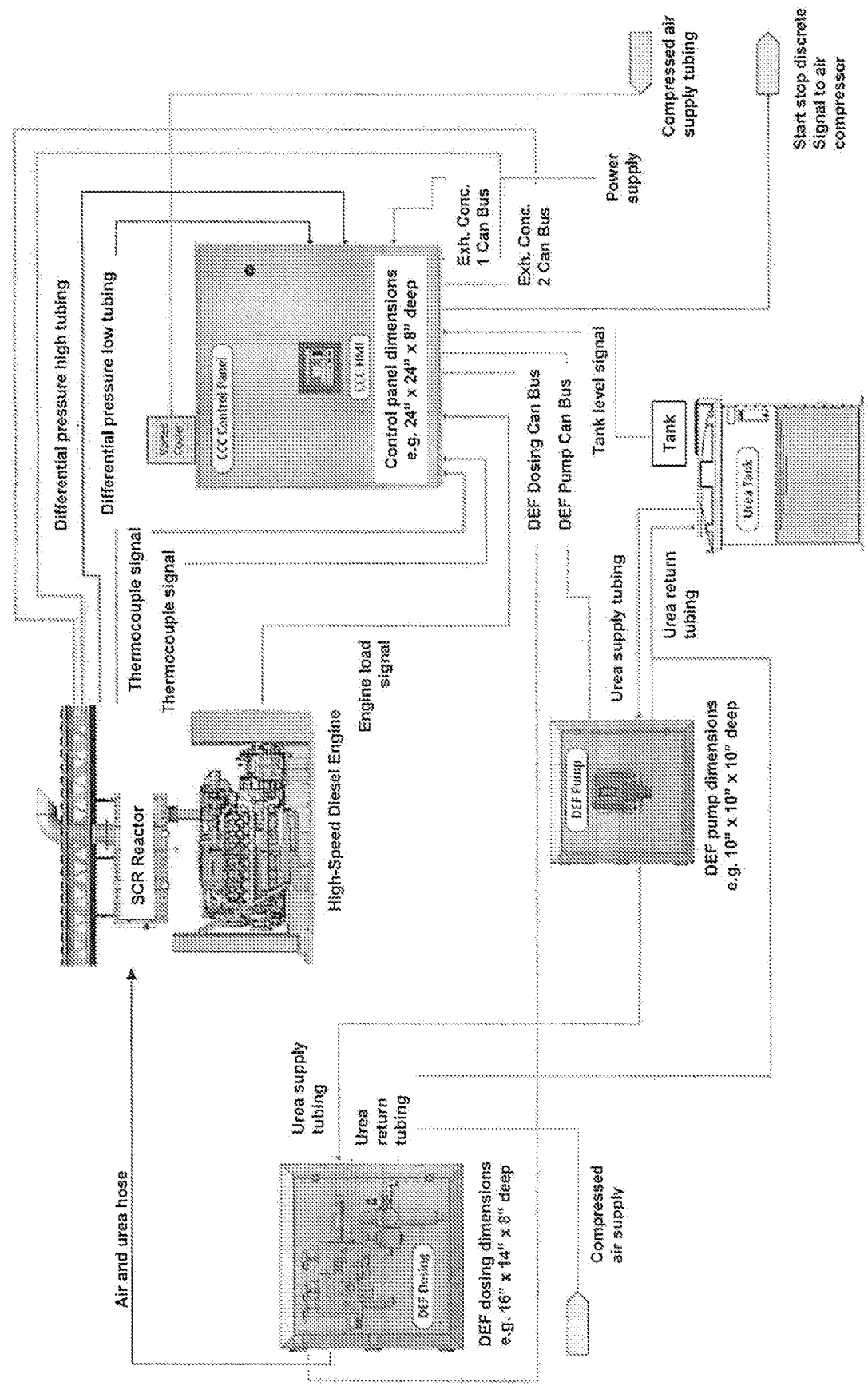
FIG. 11 is a schematic of an embodiment of an SCR closed-loop control system of this disclosure. The system includes dual feedback sensors, one for $NO_x$ and another for $NH_3$ slip.
Figure 12:
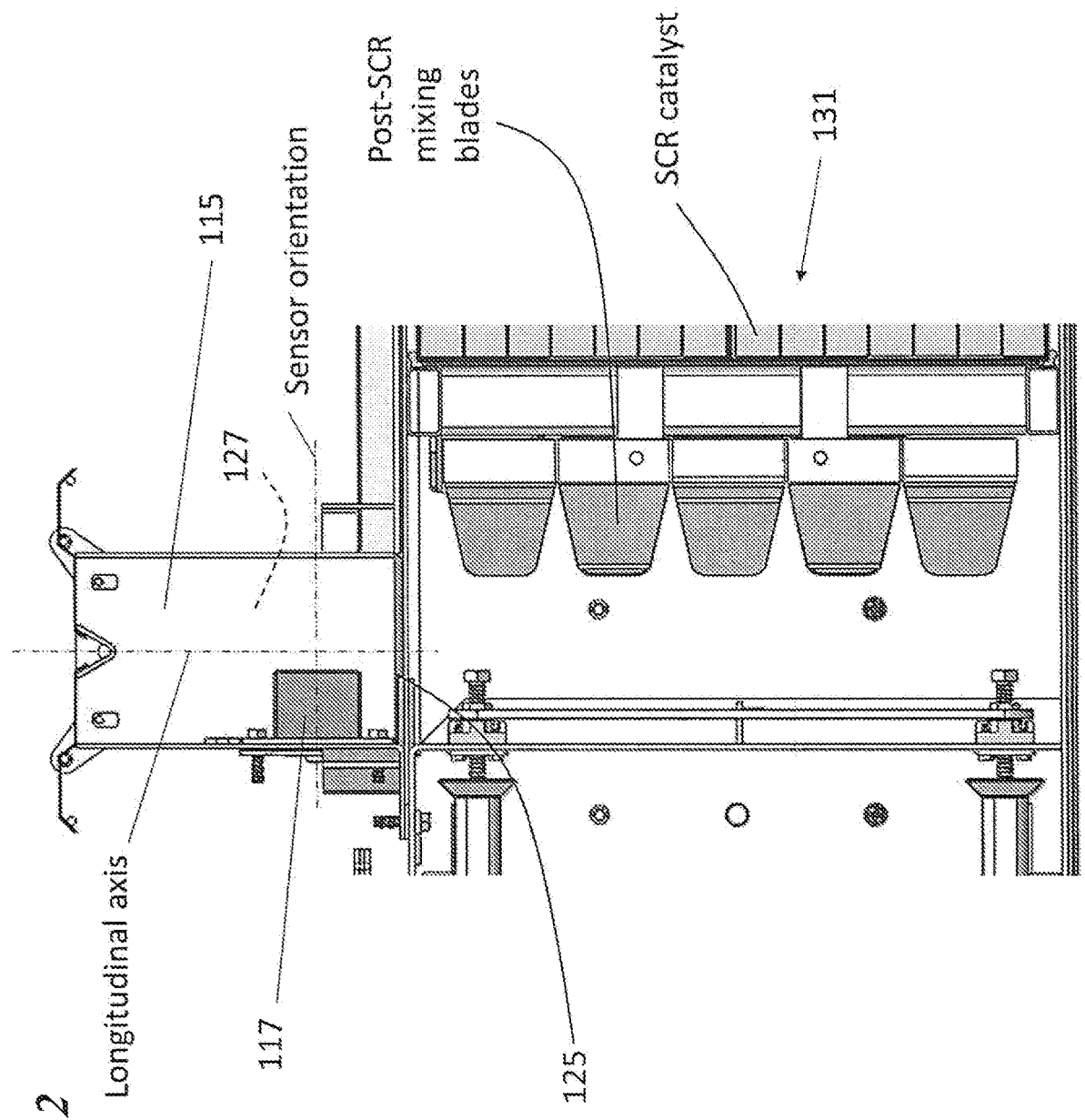
FIG. 12 shows an embodiment of a stack of an SCR reactor including a linear box located inside the stack and housing a $NO_x$ sensor, thereby isolating the sensor from any $NH_3$ slip flowing through the stack. The sensors are in communication with a controller. The mixing blades located downstream of an SCR catalyst bed remix all molecules just upstream of the $NO_x$ sensor and $NH_3$ slip sensor. This lowers variation in sensor readings and improves accuracy and precision of both sensors' readings.
Figure 13:
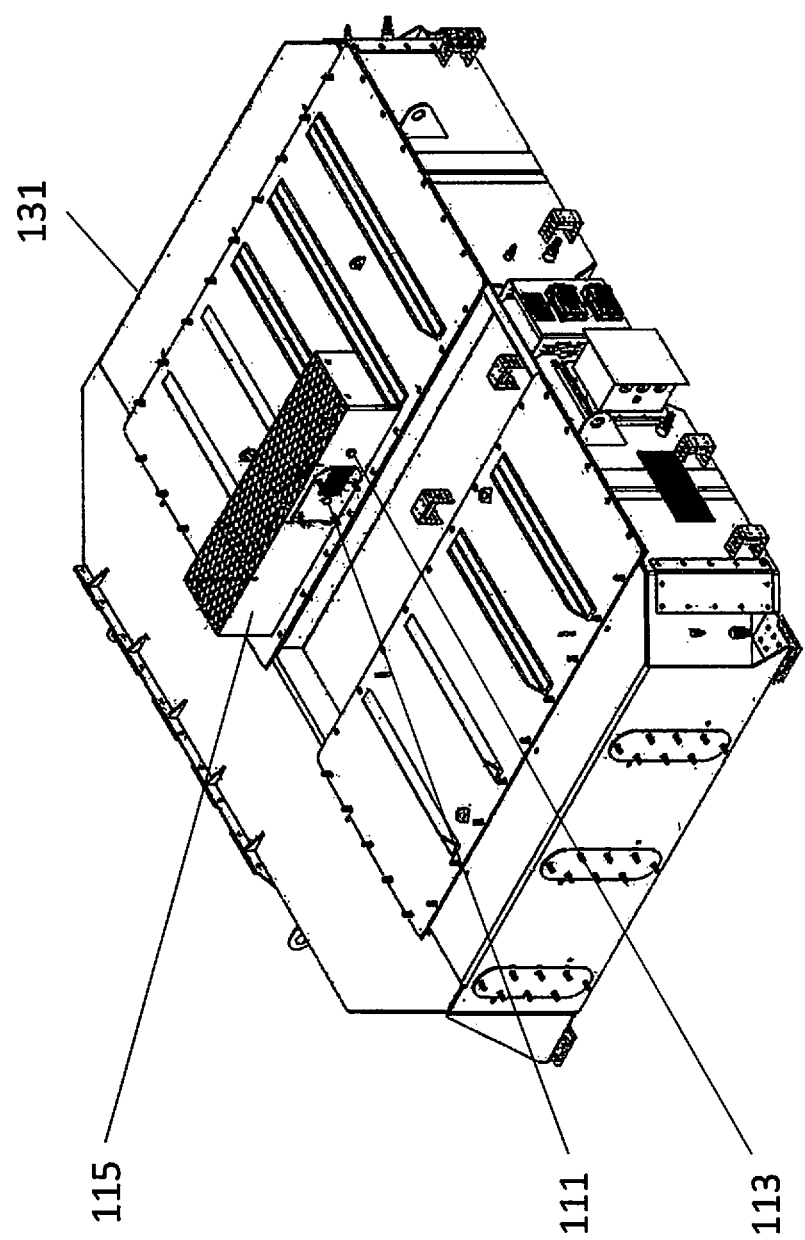
FIG. 13 is an isometric view of SCR reactor of FIG. 12. The $NO_x$ sensor is located inside the linear box. The $NH_3$ sensor is located adjacent to the linear box and within the stack.

Referring now to FIGS. 8-10, in embodiments of this disclosure a mixing duct 800 for use in diesel emission reduction system of this disclosure contains a rectangular- or square-shaped cross section sized to fit within an SCR reactor 821 and mix a liquid-reductant agent such as DEF with a diesel engine exhaust gas stream prior to the stream flowing through an SCR catalyst bed 823. In some embodiments, where large exhaust flows must be treated, the mixing duct 800 may contain a round cross section. For purposes of this disclosure, a large exhaust flow is above 50,000 actual cubic feet per minute ("ACFM") (about 1416 cubic meters per minute). The reactor 821 includes an inlet or manifold 825 configured to receive the engine exhaust flow.

Located within the mixing duct 800 is at least one static mixer assembly 801. The static mixer assembly 801 may be located downstream of a first catalyst surface, such as an oxidation catalyst of this disclosure, over or through which the exhaust gas stream may flow. A urea or ammonia injection lance 805 may be fitted upstream of the static mixer assembly 801 and configured to inject the urea or ammonia into the mixing duct 800. A dosing turndown ratio of the injection lance 805 in combination with the mixing duct 800, over a dynamic range of exhaust gas flow, may be in a range of 4:1 to 10:1. The mixed exhaust-reagent stream may then pass through a SCR catalyst bed 803.

By way of a non-limiting example, in embodiments the mixing duct 800 may contain two or more static mixer assemblies 801, with one assembly 801 configured to divert flow in one direction and another assembly 801 configured to divert flow in another direction. Another of the assemblies 801 may be configured to channel flow to a certain portion of the duct 800. A mixing blade set 819 may be located downstream of the SCR catalyst bed 803 and arranged to remix all molecules just upstream of the NOx sensor and ammonia (NH$_3$) slip sensor.

In embodiments, the mixing quality achieved, as measured by root-mean-square ("RMS") deviation for the NOx and ammonia concentration, may be less than 3%, and may be in a range or 0.25% to 2.75%. In some embodiments, the RMS deviation is no greater than 1%.

Referring now to FIGS. 11-15, in embodiments of this disclosure, a closed-loop control system 110 includes dual feedback sensors 111, 113, one for NO$_x$ and another for NH$_3$ slip. Both sensors 111, 113 are located toward an inlet end 125 of an exhaust stack 115 of the SCR reactor 131. The NH$_3$ slip sensor 113 reading provides an accurate and precise bias correction in real time to the NO$_x$ sensor 111 reading. The sensors 111, 113 may be automotive-style (CAN bus-enabled) sensors installed sideway to the stack 115 without the need for sampling probes or sampling lines.

In embodiments, the control loop 110 includes an NH$_3$ slip sensor 113 located within an interior space 127 of an exhaust stack 115 of an SCR reactor and a linear box 117 located downstream and adjacent to the NH$_3$ slip sensor. The linear box 117 includes face panels 119 that surround and isolate the NO$_x$ sensor 111 contained within an interior space defined by the face panels 119. Two of the face panels 119B, 119T, one on an inlet flow side 121 of the box 117 and another on the outlet flow side 123, contain an oxidation catalyst. The NH$_3$ slip sensor 113 and the NO$_x$ sensor 111 are mounted sideway to the stack 115 and may include a controller area network ("CAN") bus connector. The NO$_x$ sensor 111 is located in the box 117, the NH$_3$ slip sensor 113 is bolted in the stack 115, aside the linear box 117 and not in the linear box 117. The linear box 117 may be sized to handle or accommodate no more than 10%, no more than 5%, and no more than 1% of the total exhaust flow through the stack 115.

Because of this arrangement, the NO$_x$ sensor 111 reading is:

$$\text{NO}_x \text{ sensor reading} = \text{NO}_x \text{ real value} + \text{NH}_3 \text{ slip real value} \qquad \text{(Eq. 1)}$$

Because the $NH_3$ slip sensor 113 is located outside of the linear box 117, the sensor 113 is reading a real (true) value for the $NH_3$ slip in the exhaust gas stream with no bias to other molecules. In other words, the $NH_3$ slip sensor 113 may be used to make an accurate and precise bias correction in real time to the $NO_x$ sensor 111 reading. Therefore, $$NO_x \text{ real value} = NO_x \text{ sensor reading} - NH_3 \text{ sensor reading} \qquad (Eq. 2)$$

This real value may then be used by the injection control system.

Embodiments of using high-speed diesel engine of this disclosure significantly reduces fuel consumption and lube oil consumption compared to prior art medium-speed diesel engines for which the emission reduction and control of this disclosure is unachievable. By way of a non-limiting example, in embodiments of this disclosure fuel consumption is reduced between 10% and 50% when compared to a typical medium-speed diesel engine used in other locomotives of similar size and horsepower, there being subranges within this broader range. Oil consumption is reduced by at least 50% or more, 50% to 80%, 55% to 75%, 60% to 70%, 63% to 67%, there being subranges within this broader range. In embodiments of the diesel emission control system, emissions from the locomotive diesel engine are reduced, in comparison to EPA Tier 4 emission standards for newly built and newly re-manufactured locomotives, as follows: DPM emissions >50%; $NO_x$ emissions >85%; and CO and NMHC emissions >98%. The Tier 4 emission standards are incorporated by reference herein. The system of this disclosure may be configured to achieve more stringent emission standards, such as but not limited to, the proposed (2025) California Air Resources Board Near Zero emissions standards for NOx and DPM.

While embodiments of an ultra-low emitting diesel-electric locomotive using a high-Speed diesel engine have been described, the system, apparatuses, methods of its use are capable of modification by persons of ordinary skill in the art without departing from the scope of this disclosure. The claims include the full range of equivalents to which each recited element is entitled.

The invention claimed is:

1. A diesel-electric locomotive comprising:
an electronic locomotive controller (21) in communication with a diesel engine (11) having a designed operating rpm in a range of 1150 rpm to 2400 rpm;
a traction generator (15) connected at one end to the diesel engine, the traction generator being at a same or a lower speed than that of the diesel engine;
a diesel emissions reduction unit (30, 821) including:
an inlet (825) configured to receive an exhaust stream of the diesel engine;
means (31) for trapping at least a portion of diesel particulate matter contained in the exhaust stream;
a dosing system (33) including a dosing controller (39) in electronic communication with the electronic locomotive controller (21) and a nitrogen oxide ("$NO_x$") concentration sensor (41, 111) and an ammonia ("$NH_3$") concentration sensor (43, 113), the dosing system configured to meter aqueous $NH_3$ into the exhaust stream and including at least one oxidation catalyst panel (119) arranged to isolate the $NO_x$ concentration sensor from $NH_3$ in the exhaust stream;
one or more static mixing elements (35) located between the dosing system and the $NO_x$ and $NH_3$ concentration sensors to mix the metered aqueous $NH_3$ in the exhaust stream;
a selective catalyst reactor bed (37, 823) located between the mixing elements and the $NO_x$ and $NH_3$ concentration sensors; and
an exhaust heating system (50) in communication with at least one of the dosing and electronic locomotive controllers, the exhaust heating system configured to heat the exhaust stream of the diesel engine toward the inlet of the diesel emissions reduction unit.

2. The diesel-electric locomotive of claim 1, further comprising:
the means for trapping the diesel particulate matter including a diesel oxidation trap catalyst (410) comprised of a substrate (411) including one or more coated, corrugated, micro-expanded metal foil layers (413);
each of said layers containing a plurality of eyes (419) with openings;
a coating (421) of each said layer including a precious metal, a metal oxide, and a porous surface.

3. The diesel-electric locomotive of claim 2, the openings being in a range of 0.058 mm to 2.032 mm.

4. The diesel-electric locomotive of claim 2, the coating including a washcoat layer (423) being in a range of 80.5 g/l to 102.5 g/l and having a porous surface area in a range of 100 $m^2$/g to 250 $m^2$/g of the metal oxide.

5. The diesel-electric locomotive of claim 2, the precious metal being in a range of 0.071 g/l to 1.41 g/l.

6. The diesel-electric locomotive of claim 2, flow channels (427) per unit area of a face of the substrate being in a range of 15 cells/$cm^2$ to 62 cells/$cm^2$.

7. The diesel-electric locomotive of claim 1, further comprising:
the $NH_3$ concentration sensor located within an interior space (127) of an exhaust stack (115) of the diesel emissions reduction unit, toward an inlet end (125) of the exhaust stack; and
a box (117) located within the exhaust stack, downstream and adjacent to the $NH_3$ concentration sensor; the box including the at least one oxidation catalyst panel (119) and the $NO_x$ concentration sensor.

8. The diesel-electric locomotive of claim 7, further comprising:
the $NH_3$ concentration sensor and the $NO_x$ concentration sensor include a controller area network bus connector (C).

9. The diesel-electric locomotive of claim 7, wherein the $NH_3$ concentration sensor and the $NO_x$ concentration sensor are mounted transverse to a longitudinal axis of the exhaust stack.

10. The diesel-electric locomotive of claim 1, further comprising, the mixing elements including:
a mixing duct (800);
at least two static mixer assemblies (801) located within the mixing duct, one of assemblies diverting exhaust flow in one direction and another of the assemblies diverting exhaust flow in another direction.

11. The diesel-electric locomotive of claim 1, the exhaust heating system 50 including at least one heater (51) including an electric heating element.

12. The diesel-electric locomotive of claim 11, the at least one heater connected to the traction generator.

13. A method of treating an exhaust stream of a diesel-electric locomotive, the diesel-electric locomotive including a diesel engine (11) having a designed operating rpm in a range of 1150 rpm to 2400 rpm, an electronic locomotive controller (21) in electronic communication with the diesel engine, and a traction generator (15) connected at one end to the diesel engine, the traction generator being at a same or a lower speed than that of the diesel engine; the method comprising:

passing the exhaust stream into a diesel emissions reduction unit (30, 821),
wherein the diesel emissions reduction unit includes:
an inlet (825) configured to receive an exhaust stream of the diesel engine;
means (31) to trap at least a portion of diesel particulate matter contained in the exhaust stream;
a dosing system (33) including a dosing controller (39) in communication with the electronic locomotive controller (21) and a nitrogen oxide ("$NO_x$") concentration sensor (41, 111) and an ammonia ("$NH_3$") concentration sensor (43, 113), the dosing system configured to meter aqueous $NH_3$ into the exhaust stream and including at least one oxidation catalyst panel (119) arranged to isolate the $NO_x$ concentration sensor from $NH_3$ in the exhaust stream;
one or more static mixing elements (35) located between the system controller and the $NO_x$ and $NH_3$ concentration sensors to mix the metered aqueous $NH_3$ in the exhaust stream;
a selective catalyst reactor bed (37, 823) located between the mixing elements and the $NO_x$ and $NH_3$ concentration sensors; and
prior to the passing, heating the exhaust stream when a temperature of the exhaust stream falls below a predetermined reaction temperature.

14. The method of claim 13, wherein the means for trapping the diesel particulate matter include:
a diesel oxidation trap catalyst (410) comprised of a substrate (411) including one or more coated, corrugated, micro-expanded metal foil layers (413); each of said layers containing a plurality of eyes (419) with openings;
a coating (421) of each said layer including a precious metal, a metal oxide, and a porous surface.

15. The method of claim 14, wherein
the openings being in a range of 0.058 mm to 2.032 mm;
the coating including a washcoat layer (423) being in a range of 80.5 g/l to 102.5 g/l and having a porous surface area in a range of 100 $m^2$/g to 250 $m^2$/g of the metal oxide;
the precious metal being in a range of 0.071 g/l to 1.41 g/l.

16. The method of claim 13, wherein:
the $NH_3$ concentration sensor is located within an interior space (127) of an exhaust stack (115) of the diesel emissions reduction unit, toward an inlet end (125) of the exhaust stack; and
wherein a box (117) is located within the exhaust stack, downstream and adjacent to the $NH_3$ concentration sensor; the box including the at least one oxidation catalyst panel and the $NO_x$ concentration sensor.

17. The method of claim 16, wherein the $NH_3$ concentration sensor and the $NO_x$ concentration sensor include a controller area network bus connector (C).

18. The method of claim 15, wherein the $NH_3$ concentration sensor and the $NO_x$ concentration sensor are mounted transverse to a longitudinal axis of the exhaust stack.

19. The method of claim 13, wherein the mixing elements include:
a mixing duct (800):
at least two static mixer assemblies (801) located within the mixing duct, one of assemblies diverting exhaust flow in one direction and another of the assemblies diverting exhaust flow in another direction.

20. The method of claim 13, wherein the heating includes at least one heater containing an electric heating element.

* * * * *